Sept. 30, 1924.

J. B. FUHR ET AL 1,510,395

DEMOUNTABLE RIM

Filed April 9, 1923

Joseph B. Fuhr
Arthur A. Barnes
INVENTORS

Patented Sept. 30, 1924.

1,510,395

UNITED STATES PATENT OFFICE.

JOSEPH B. FUHR AND ARTHUR A. BARNES, OF PHILADELPHIA, PENNSYLVANIA, ASSIGNORS TO FUHR-BARNES MANUFACTURING COMPANY, OF PHILADELPHIA, PENNSYLVANIA, A CORPORATION OF DELAWARE.

DEMOUNTABLE RIM.

Application filed April 9, 1923. Serial No. 630,885.

*To all whom it may concern:*

Be it known that we, JOSEPH B. FUHR and ARTHUR A. BARNES, citizens of the United States, residing at Philadelphia, in the county of Philadelphia and State of Pennsylvania, have invented new and useful Improvements in Demountable Rims, of which the following is a specification.

This invention relates to rims for automobile wheels, and the principal object is to provide a device of this nature having all of the advantages of durability of the solid rim and at the same time being constructed to effect a very easy removal of the tire.

Another important object is to produce a device of this nature which shall be designed for rapid and cheap production.

Another object is to so construct the rim that in case of a puncture, the battering down or bending of the flanges will not prevent removal of the tire or render the rim useless so that it must be discarded.

Another object is to provide a device of this nature which shall be devoid of parts overhanging the wheel proper.

Another object is to provide a device in which the locking member shall be so constructed and disposed as to effect partial disassociation of the rim elements when moved to unlocked position.

Another object is to provide a locking device which needs no special tools to operate it.

Another object is to produce a rim which when on the wheel will stand all the tests that a solid rim will, and which when demounted will stand considerably more overload than is ever required of a rim.

With these and other objects in view as will be more apparent, the invention consists in certain novel construction and combination and arrangement of parts, the essential features of which are hereinafter fully described, are particularly pointed out in the appended claim, and are illustrated in the accompanying drawing, in which:—

Like characters of reference refer to like parts in all views.

Figure 1:
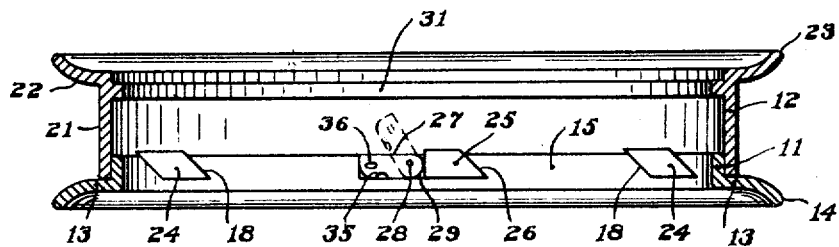
Figure 1 is a sectional view of our improved rim per se.

It is well known in the art that from the standpoint of strength and durability, the solid rim is far superior to the split or contractible rim; but it is extremely difficult to remove the tire from a solid rim, and for this reason the contractible rim has become very popular. However, even with these split rims, there is the disadvantage of having to have a special tool to effect the breaking or lapping at the line of split. The present invention contemplates the construction of a rim having substantially the strength and durability of a solid rim, and at the same time the advantage of easy removal of the tire as in the case of the split rim and without having to use a special tool.

Referring to the drawing in detail, 10 represents the wheel of an automobile, and 11 and 12 represent the two sections generally of our improved rim.

The rim section 11 is formed with a flange 13 which has an overturned edge 14. The flange 13 when in closed condition, presses its inner face against the side of the tire to confine it in place, as will be readily understood. The cylindrical body portion 15, is cut away at a number of places indicated as 16 and at one place 17. The cut-out at 16 has inclined faces 18 at both ends; but the cut-out at 17 has one inclined face 19, and one abrupt face 20. These cut-out portions co-operate with lugs on the section 12 as will be presently set forth in detail.

The section 12 comprises a cylindrical body portion 21 which supports the entire inner surface of the tire. It also includes a flange 22 having an overturned edge 23 corresponding to the elements 13 and 14 of section 11. The body portion 21 is made of substantially the same internal diameter as the outer diameter of body 15 of section 11 so that 15 fits snugly but slidingly within 21. The inside of body 21 is provided with a plurality of inwardly projecting lugs 24 of which there is one for each cut-out 16, and of proper size and shape to fit snugly in said cut-out. Roughly speaking, lugs 24 have the shape of oblique parallelograms with the angles rounded off slightly so as to more easily effect the connection required of them, the seats or cut-out portion 16 being correspondingly rounded. There is also a lug 25 having an oblique face 26, this lug being intended to enter cut-out 17 with face 26 contacting with the aforementioned face 19.

It will now be apparent that the two sections 11 and 12 may be securely fastened to each other by inserting lugs 24 and 25 in the respective recesses 16 and 17 with a slightly rotary relative motion, and that in bringing these parts into co-operation, the element 15 will extend within the element 21 forming with lugs 24 and 26 a substantially solid internal annular rib except near the aforementioned abrupt face 20. Lug 26 only partly fills recess 17, the balance of this recess being occupied by the locking latch, now to be described.

Figure 2:
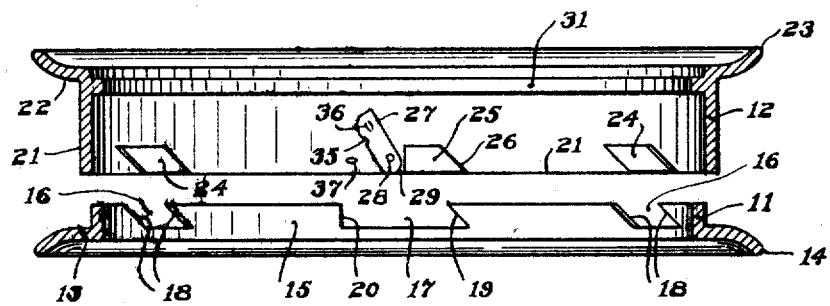
Figure 2 is a similar view of the rim detached.
Figure 3:
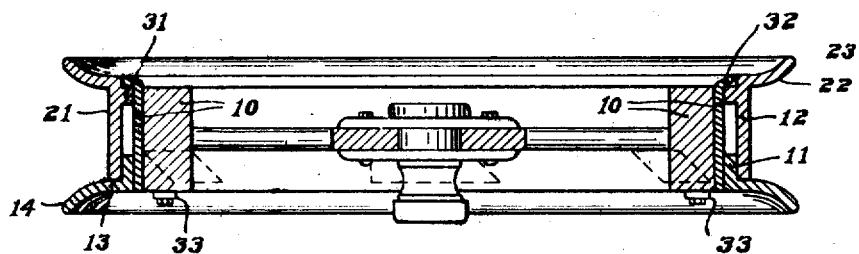
Figure 3 is an attached sectional view of the rim as applied to a wheel.

After the sections 11 and 12 have come into engagement as above mentioned, it is necessary that they be locked against accidental displacement. For this purpose we provide a latch or locking member 27 pivoted to 21 at 28 and having its pivot so arranged that the heel or end 29 when turned to the unlocking position shown in Figure 2 would strike element 15 thereby slightly separating sections 11 and 12 so as to overcome any "freezing" of one section to another, and start the disassociating movement of the sections. At the same time, the longer end 30 forms a convenient element to pry against as at notch 35 and is of proper size and shape to fill up the balance of recess 17 and co-operate with face 20 to lock the sections 11 and 12 together, as shown in Figure 1.

The section 12 is also provided with an annular internal rib 31 which with element 15 support the rim on the wheel 10. Rib 31 is suitably shaped to abut against the flange 32 on the inside of the wheel. The clamps 33 are placed opposite the cut-out portions or recesses 16 and 17 so as to reinforce the rim at these, the weakest places.

Latch 27 is provided with an extrusion 36 which seats in an indentation 37 in member 21 to lock the latch against accidental displacement.

While we have described what we deem to be the most desirable embodiment of our invention, it is obvious that many of the parts may be varied without in any way departing from the spirit of our invention, and we therefore do not limit ourselves to the exact details of construction herein shown nor to anything less than the whole of our invention limited only by the appended claim.

What we claim is:—

A wheel rim comprising companion overlapping sections, one of said sections being provided with diagonally arranged cut-out portions at its inner edge, diagonally arranged lugs on the other section for engagement in said recess, said recessed section being provided with a relatively large locking recess having a diagonal end and a straight end, a locking lug on the lug carrying section for fitting in said locking recess and being shorter than the recess, a locking member pivotally connected to the lug carrying section and having long and short end portions, said locking member adapted to swing into said locking recess with its short end against said locking lug for locking the sections connected and when swung into unlocking inoperative position, the shorter end of the locking member will engage the edge of the locking recess and move the sections apart.

In testimony whereof we affix our signatures.

JOSEPH B. FUHR.
ARTHUR A. BARNES.